United States Patent [19]
Belt et al.

[11] Patent Number: 5,980,650
[45] Date of Patent: Nov. 9, 1999

[54] FLUX SUITABLE FOR SOLDERING LIGHT METALS SUCH AS ALUMINUM

[75] Inventors: Heinz-Joachim Belt, Burgwedel; Alfred Borinski; Ruediger Sander, both of Sehnde; Werner Rudolph, Hannover, all of Germany

[73] Assignee: Solvay Fluor und Derivate GmbH, Hannover, Germany

[21] Appl. No.: 08/590,636

[22] Filed: Jan. 24, 1996

[30] Foreign Application Priority Data

| Jan. 24, 1995 | [DE] | Germany | 195 01 937 |
| Jun. 1, 1995 | [DE] | Germany | 195 19 515 |

[51] Int. Cl.$^6$ ............................................. B23K 35/363
[52] U.S. Cl. .................. 148/26; 148/23; 148/24; 148/25; 423/116; 423/464; 423/465
[58] Field of Search .................. 148/23, 24, 25, 148/26; 423/116, 464, 465

[56] References Cited

U.S. PATENT DOCUMENTS

| 1,937,956 | 12/1933 | Henninger et al. | 23/88 |
| 3,506,395 | 4/1970 | Yamaguchi et al. | 23/88 |
| 4,428,920 | 1/1984 | Willenberg et al. | 423/465 |
| 4,579,605 | 4/1986 | Kawase et al. | 148/26 |
| 4,670,067 | 6/1987 | Suzuki et al. | 148/26 |
| 4,888,067 | 12/1989 | Sato et al. | 148/26 |
| 5,100,048 | 3/1992 | Timsit | 229/198 |
| 5,171,377 | 12/1992 | Shimizu et al. | 148/23 |
| 5,190,596 | 3/1993 | Timsit | 148/23 |
| 5,232,788 | 8/1993 | Timsit et al. | 428/560 |
| 5,318,764 | 6/1994 | Meshri et al. | 423/465 |

FOREIGN PATENT DOCUMENTS

| 140267 | 10/1984 | European Pat. Off. |
| 295 541 | 12/1988 | European Pat. Off. |
| WO 93/15868 | 8/1993 | WIPO |

OTHER PUBLICATIONS

Tananaev, I.V. and Nekhamikina, M.A., "Physiochemical analysis of systems significant in analytical chemistry", vol. 48, pp. 226–237, 1950.

Wallis, B. and Bentrup, U., "On the thermal dehydration of potassium aluminum fluoride hydrate", Z. Anorg. Chem. Akad. Wiss. pp. 221–227, 1990.

Abstract of Japanese Patent Application No. JP 60-099447.
Abstract of Japanese Patent Application No. JP 61-74769.
Abstract of Japanese Patent Application No. JP 51-85286.

Nagao et al., Manufacture of Fluxes for Soldering Aluminum, *Chemical Abstracts*, 118 (1993), p. 325, No. 152699c (counterpart of Published Japanese Patent Application No. JP 04-361,895).

Suzuki, "Manufacture of Alkali Metal Fluoroaluminate for Fluxes", *Chemical Abstracts*, 108 (1988), p. 298, No. 172174z (counterpart of Published Japanese Patent Application No. JP 62-72,519).

Tananaev et al., "Phsicochemical Analysis of Systems Significant in Analytical Chemistry", *Chemical Abstracts*, vol. 48, p. 8012.

Wallis et al., "On the Thermal Dehydration of Potassium Aluminum Fluoride Hydrate", *A. anorg. allg. Chem.*, 589 (1990) 221–227.

Bukovec et al., "The Relation Between Structure and Dehydration of $K_2MF_5H_2O$ Compounds", *Thermochimica Acta*, 92 (1985) 689–92.

*Primary Examiner*—Patrick Ryan
*Assistant Examiner*—M. Alexandra Elve
*Attorney, Agent, or Firm*—Evenson, McKeown, Edwards & Lenahan, P.L.L.C.

[57] ABSTRACT

A flux which contains irreversibly dehydrated $K_2AlF_5$, for soldering light metal materials, in particular aluminum. The flux has the advantages of forming a very uniform flux coating on the workpiece or workpieces to be soldered and exhibiting outstanding flow of the solder. An appropriate soldering process, an aqueous flux suspension and preparation processes for the flux are also disclosed.

9 Claims, No Drawings

FLUX SUITABLE FOR SOLDERING LIGHT METALS SUCH AS ALUMINUM

BACKGROUND OF THE INVENTION

The invention relates to a process for brazing metallic materials, an aqueous flux suspension and a novel flux for use in a brazing process and a preparation process for the novel flux.

During brazing, metal materials are joined at a temperature of above 500° C. with the aid of a molten additional metal (solder). The melting point of the solder is lower than the melting point of the materials, so that the solder joints of many metals can be separated in a nondestructive manner by melting the solder again.

During soldering, oxides and other interfering top layers on the metal surface present a problem: the surface must be metallically pure so that a satisfactory solder joint forms. This is achieved using fluxes, which are generally brushed on, sprayed on or applied as a solder covering on the material.

Fluxes based on alkali metal salts, preferably potassium salts, of complex aluminum fluorides are particularly suitable, for example for brazing light metal materials, in particular alloyed (for example with magnesium) or unalloyed aluminum materials, since they are non-corrosive and non-hygroscopic. Fluxes of this type which are, for example, mixtures of $KAlF_4$ and $K_3AlF_6$ or mixtures of $KAlF_4$ and $K_2AlF_5$ are already known, and the last mentioned compound can optionally be present as the hydrate.

The surface-cleaning action of a flux is evident from, inter alia, the fact that, after melting, the solder runs on the surface of the component or of the components. The better the surface of the component has been cleaned by the flux, the more readily the solder runs on that surface.

SUMMARY OF THE INVENTION

It was an object of the present invention to provide a flux which improves the flow behavior of the solder on the surface of metal materials, in particular based on light metal materials, such as aluminum.

A further object was to provide a corresponding aqueous suspension of the flux, a novel flux and a process for preparing the flux.

These and other objects have been achieved in accordance with the present invention by providing a process for brazing metal workpieces comprising applying a flux composed of alkali metal salts of complex aluminum fluorides, wherein said flux comprises irreversibly dehydrated $K_2AlF_5$.

DETAILED DESCRIPTION OF PREFERRED EMBODIMENTS

The process according to the invention for brazing metallic materials, in particular light metal materials, using a flux based on alkali metal salts, preferably potassium salts, of complex fluorides of aluminum is characterized in that a flux which contains irreversibly dehydrated $K_2AlF_5$ is used. The term "irreversibly dehydrated $K_2AlF_5$" is explained below.

The thermal behavior of hydrated $K_2AlF_5$ ($K_2AlF_5.H_2O$) has already several times been the target of scientific investigations. Bukovec and Bukovec, *Thermochimica Acta* 92 (1985), pages 689 to 692, have investigated the dehydration of the hydrate at temperatures up to about 200° C. Tananaev and Nekhamkina, *Izvest. Sektora Fiz.-Khim. Anal. Akad. Nauk S.S.S.R.* 20 (1950), pages 227 to 237 (*Chemical Abstracts* Vol. 48, 1954, Abstract No. 8012a) have observed that, in the thermogram, the hydrate exhibits, at 145 to 165° C., an endothermic effect which is due to the dehydration and, at 230 to 260° C., an exothermic effect which is due to the recrystallization of the anhydrous salt. Wallis and Bentrup have published an X-ray and thermoanalytical investigation of the thermal dehydration of $K_2AlF_5.H_2O$ in *Z. Anorg. und Allg. Chem.* 589 (1990), pages 221 to 227. It was found that the hydrate is converted reversibly at a temperature in the range from 90 to 265° C. into $K_2AlF_5$ which crystallizes in the tetragonal system. At 265 (±10)° C., irreversible formation of $K_2AlF_5$ crystallizing in the orthorhombic system occurs (designated as "Phase II" in the publication). Under quasi-isobaric conditions, the irreversibly dehydrated product Phase II was present at temperatures as low as 228° C. Such a $K_2AlF_5$ crystallized in the orthorhombic system is designated as "irreversibly dehydrated $K_2AlF_5$" within the scope of the present invention.

The results of the scientific investigations have however not been used at all in the technology of flux preparation. Willenberg, U.S. Pat. No. 4,428,920, discloses the preparation of a flux by combining fluoroaluminic acid and a potassium compound (used in a substoichiometric amount), for example KOH (or potassium hydroxide solution). The melting points were determined for products which had been dried at 120° C. Kawase, U.S. Pat. No. 4,579,605, discloses a flux for soldering aluminum, which flux consists of $KAlF_4$ and $K_2AlF_5.H_2O$ or $K_2AlF_5$. This flux is prepared, for example, by dissolving aluminum hydroxide in hydrofluoric acid and adding potassium compounds. A drying temperature of 100° C. is stated as being sufficient. Meshri, U.S. Pat. No. 5,318,764, discloses various methods for preparing a flux based on potassium salts of complex fluorides of aluminum; for example, by combination of aluminum oxide trihydrate with KF or $KHF_2$ and HF, or of aluminum fluoride trihydrate and KF or $KHF_2$, or by combination of aluminum oxide trihydrate and potassium hydroxide solution and subsequent addition of HF. According to the Examples, drying is carried out at 150° C.

The advantage of using fluxes which contain $K_2AlF_5$ irreversibly dehydrated according to the invention is that the solder exhibits very much better flow behavior than fluxes without irreversibly dehydrated $K_2AlF_5$.

The soldering process is carried out in a known manner. The flux is advantageously applied in the form of an aqueous suspension, which is likewise a subject of the present invention, to one or more of the metal materials to be joined. Advantageously, the suspension contains 3 to 60% by weight of the flux; the remainder of the flux up to 100% by weight comprises water and any impurities. After application to the material or materials or component or components, the suspension of the invention forms an especially loose layer which resembles snow in appearance. Such a loose flocculant layer completely covering the desired area of the material is very advantageous with respect to application techniques. The metal materials are then heated, for example in an oven or by means of a burner, first the flux and then the solder melting and a solder joint forming. If desired, soldering can be carried out in an inert gas atmosphere, for example in a nitrogen atmosphere. However, the soldering process can also be carried out in an atmosphere comprising air.

The soldering process according to the invention can be modified. For example, according to the teachings of U.S. Pat. No. 5,100,048 and U.S. Pat. No. 5,190,596, the disclosures of which are incorporated herein by reference, or WO 92/12821, respectively, a metal which is advantageously present in finely powdered form (for example in the form of particles having a size of less than 1000 μm, preferably in the range from 4 to 80 μm) and which forms a solderable eutectic mixture with one or both metal surfaces to be soldered can be mixed with the flux. Silicon is particularly suitable, and copper and germanium are also suitable. Thus, it is possible to use a flux which contains 10 to 500 parts by weight of finely powdered metal per 100 parts by weight of the complex aluminum fluorides. In addition, it is also possible to admix further metals in finely powdered form, which modify the surface properties of the soldered parts or of the eutectic mixture which forms. Thus, finely powdered iron, manganese, nickel, zinc, bismuth, strontium, chromium, antimony or vanadium can be admixed, as described in WO 92/12821.

According to the teaching of WO 93/15868, it is also possible to apply to the metal parts to be joined a metallic coating in which the flux is then embedded. For example, zinc layers or layers of zinc/aluminum alloy are very suitable.

The invention also relates to a flux which contains irreversibly dehydrated $K_2AlF_5$. Since the pure, irreversibly dehydrated $K_2AlF_5$ having an orthorhombic crystal habit is already known from the publication by Wallis and Bentrup, a flux which consists of this pure $K_2AlF_5$ crystallized in the orthorhombic system is excluded from the scope of the invention, unless it occurs in the form of brittle, irregular crystals. The preparation of such a product having irregular crystals will be described below (abrupt evaporation of the water at appropriately high temperature).

A preferred flux thus contains irreversibly dehydrated $K_2AlF_5$ in the form of irregular, brittle crystals, or consists thereof.

The flux advantageously contains 1 to 97% by weight of $KAlF_4$, 1 to 20% by weight of irreversibly dehydrated $K_2AlF_5$, 0 to 15% by weight of reversibly dehydrated $K_2AlF_5$, 0 to 15% by weight of $K_2AlF_5.H_2O$ and 0 to 10% by weight of $K_3AlF_6$. A flux which contains 86 to 97% by weight of $KAlF_4$, 3 to 14% by weight of irreversibly dehydrated $K_2AlF_5$, and 0 to 8% by weight of rehydratable $K_2AlF_5$, 0 to 86 by weight of $K_2AlF_5.H_2O$ and 0 to 4% by weight of $K_3AlF_6$ or consists of the stated components is particularly preferred. Water (moisture) which is not chemically bonded may also be present, for example 0 to 7% by weight.

A preferred variant of the flux comprises, per 100 parts by weight of the compounds of complex aluminum fluorides, additionally 10 to 500 parts by weight of an admixed finely powdered metal which forms a eutectic mixture with one or both of the metal surfaces during soldering. The flux may additionally comprise one or more of the metals mentioned above which modify the surface properties of the metal parts to be joined.

Besides having the aforementioned advantageous effect on the flowability of the solder, the flux has a long shelf life. In addition, stable suspensions form on suspending in water. This is advantageous for applying the flux to the workpieces to be joined, as is the aforementioned flocculant structure on the workpieces.

A particular aspect of the present invention relates to the preparation of the flux according to the invention. For this purpose, either a mixture of the components is produced, irreversibly dehydrated $K_2AlF_5$ being mixed with the other constituents or a flux which is already ready to use as such being added. Alternatively, the corresponding reversibly dehydrated product and/or the hydrate compound can be admixed and then subjected to a heat treatment, or material which contains the stated intermediates is subjected to a heat treatment.

In accordance with one preferred embodiment, it is therefore possible first to prepare the hydrate compound or reversibly dehydrated $K_2AlF_5$, for example as described by Wallis and Bentrup, by precipitation from K- and Al-containing HF solution with ethanol and subsequent drying. The resulting intermediate is then brought to an elevated temperature for a sufficient period so that at least a part of the intermediate is converted into the irreversibly dehydrated product. The prepared pentafluoroaluminate can then be used as such or it can be added to other fluxes which are ready to use as such or mixed with other alkali metal salts, preferably potassium salts, of other complex fluorides of aluminum. For example, mixtures of irreversibly dehydrated product with $KAlF_4$, $K_2AlF_5.H_2O$, reversibly dehydrated pentafluoroaluminate and/or $K_3AlF_6$ can be produced. These mixtures then are fluxes according to the invention.

In accordance with another embodiment, $K_2AlF_5.H_2O$ and/or reversibly dehydrated $K_2AlF_5$ are added to intermediates of fluxes, for example to the moist filter cakes which are obtained in the preparation, or to fluxes which are ready to use as such. The resulting mixtures are then brought to an elevated temperature for a sufficient period so that the hydrate compound or the reversibly dehydrated product is at least partially converted into the irreversibly dehydrated product. Fluxes according to the invention are then present.

A further embodiment envisages converting fluxes which are ready to use as such and contain reversibly dehydrated pentafluoroaluminate or the hydrate compound into an improved product according to the invention by heat treatment with formation of irreversibly dehydrated $K_2AlF_5$.

A further embodiment of the preparation process envisages integrating the heat treatment in one of the preparation processes for fluxes based on alkali metal salts of complex aluminum fluorides. The flux is precipitated from aqueous solution which contains alkali metal ions, preferably potassium ions, aluminum ions and fluoride ions, and is dried, if desired, and then heat treated. For example, the flux can be prepared as described by Willenberg, Kawase or Meshri and can be subjected to a heat treatment so that the hydrate compound present or the reversibly dehydrated pentafluoroaluminate is at least partially or completely converted into irreversibly dehydrated product. The precipitation reaction is known (cf. Willenberg) to be carried out preferably at between 70° C. and 90° C. The precipitated reaction product is advantageously separated from the supernatant liquid, for example in a rotary filter or a centrifuge, and then subjected to the heat treatment. The temperature and the duration of the heat treatment depends in particular on the residual water content (moisture and water of crystallization) and on the method of drying. If the drying is carried out, for example, batchwise in an oven, the material is brought to temperatures at which the desired irreversible dehydration occurs. Advantageously, the oven temperature is above 265° C., in particular at or above 300° C. If heating is carried out too strongly, hydrolysis or disproportionation products may form (for example of tripotassium hexafluoroaluminate); such products may be troublesome in some applications. With regard to the duration of the heat treatment, it is clear that it depends, for example, on the geometry of the oven and on the method of filling the oven with the product to be dried. The heat treatment is carried out until the desired content of irreversibly dehydrated product is present. The course of the conversion can be monitored by X-ray analysis. During drying, it is generally advantageous to dry at temperatures above 375° C., since in this case, particularly with abrupt heating, small, brittle, irregularly shaped crystals form, which are very advantageous with regard to the techniques of applying them to the workpieces.

The heat treatment can also be carried out in a continuous procedure, for example in spray dryers or pneumatic dryers. Such dryers have the advantage that the water which is present evaporates abruptly and advantageously brittle, irregular crystals of the irreversibly dehydrated product are obtained. Due to the usually very short residence time, the ambient temperature in the dryer may also be above 500° C. Here too, the course of the dehydration can be determined by X-ray investigations and the procedure can be controlled to give the desired degree of dehydration.

The flux according to the invention and the method of use according to the invention can be employed for all those purposes for which fluxes and soldering methods involving complex fluorides of aluminum are used. It is very suitable for soldering aluminum, copper or alloys thereof with other metals. The following Examples are intended to illustrate the invention in further detail without restricting its scope.

EXAMPLE 1
Preparation of a flux according to the invention by mixing.

Irreversibly dehydrated $K_2AlF_5$ was prepared, as described by Wallis and Bentrup, by heating the corresponding hydrate compound to a temperature of about 280° C. A flux according to the invention was formed by mixing potassium tetrafluoroaluminate and the powdered irreversibly dehydrated product with one another in a weight ratio of 95:5.

EXAMPLE 2
Preparation of flux according to the invention from K-, Al- and F-containing solution with integrated heat treatment.
2.1. Preparation of the filter-moist intermediate:

The intermediate was prepared according to Willenberg, U.S. Pat. No. 4,428,920, Example 2. Tetrafluoroaluminic acid having a concentration of 21% by weight and a potassium hydroxide solution containing 10% by weight of KOH were used. The potassium hydroxide solution was added to the tetrafluoroaluminic acid solution at a temperature of 80° C. over a period of about 1 hour with stirring. The amount of potassium hydroxide solution was such that a potassium:aluminum atomic ratio of 0.8:1 was present in the reaction mixture after the end of the addition. The reaction mixture was then further stirred without the supply of heat, and the precipitated reaction product was filtered out. The predominant part of the water was separated in a centrifuge.

2.2. Heat treatment of the filter-moist intermediate

The filter-moist product prepared according to 2.1. was dried in a pneumatic dryer. The inlet temperature of the dryer was about 570° C. and the residence time was about half a second.

The resulting product was investigated by X-ray diffraction pattern analysis. It was found that, in addition to predominantly $KAlF_4$, the irreversibly dehydrated $K_2AlF_5$ was present. The compound $K_2AlF_5.H_2O$ was contained in the product in an amount of less than 7%. Reversibly dehydrated pentafluoroaluminate could not be detected. The total water content (moisture +water of crystallization) was less than 2.5% by weight; less than 0.5% by weight thereof was water of crystallization. In spite of the apparent presence of free water, rehydration of the irreversibly dehydrated pentafluoroaluminate was not observed. The melting point was about 570° C. and, according to investigation under scanning electron microscope, the crystal form was brittle and irregular.

EXAMPLE 3
Preparation of a suspension.

The product prepared according to Example 2 was suspended in water so that a suspension containing 29.7% by weight of flux was produced.

EXAMPLE 4
Use of aqueous flux suspension according to the invention.

The suspension prepared according to Example 3 was sprayed onto an aluminum workpiece. Evaporation of water occurred on heating, so that very uniform coating of the workpiece with the flux resulted. A further aluminum workpiece was placed on the first workpiece with formation of a contact surface. After the addition of the solder and further heating of the workpiece to the melting point of the solder, it was observed that the solder exhibited excellent flow behavior, resulting in excellent soldering of the workpieces.

EXAMPLE 5
Preparation of a silicon-containing flux and use thereof.

The product produced according to Example 2.2. was mixed with silicon powder so that 1 part by weight of silicon was present in the prepared flux per 2 parts by weight of the fluoroaluminates.

The flux was applied to an aluminum workpiece, as described in Example 4; the addition of a solder was unnecessary. A further workpiece was placed on the coated first workpiece. On heating, the two parts were soldered to one another.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A flux suspension for use in brazing metal workpieces comprising an aqueous suspension of alkali metal salts of complex aluminum fluorides, wherein said flux consists essentially of 1 to 20% by weight of irreversibly dehydrated $K_2AlF_5$; 1 to 97% by weight of $KAlF_4$; 0 to 15% by weight of reversibly dehydrated $K_2AlF_5$; 0 to 15% by weight of $K_2AlF_5.H_2O$; 0 to 10% by weight of $K_3AlF_6$; and 0 to 7% by weight of chemically unbound water.

2. A flux for brazing metal workpieces comprising irreversibly dehydrated $K_2AlF_5$ in admixture with at least one other alkali metal salt of a complex aluminum fluoride, wherein said flux consists essentially of 1 to 97% by weight of $KAlF_4$; 1 to 20% by weight of irreversibly dehydrated $K_2AlF_5$; 0 to 15% by weight of reversibly dehydrated $K_2AlF_5$; 0 to 15% by weight of $K_2AlF_5.H_2O$, 0 to 10% by weight of $K_3AlF_6$; and 0 to 7% by weight of chemically unbound water.

3. A flux according to claim 2, comprising 86 to 97% by weight of $KALF_4$; 3 to 14% by weight of irreversibly dehydrated $K_2AlF_5$; 0 to 8% by weight of reversibly dehydrated $K_2AlF_5$; 0 to 8% by weight of $K_2AlF_5.H_2O$; 0 to 4% by weight of $K_3AlF_6$, and 0 to 7% by weight of chemically unbound water.

4. A flux according to claim 2, further comprising 10 to 500 parts by weight of an admixed finely powdered solder metal per 100 parts by weight of the alkali metal salts of complex aluminum fluorides.

5. A flux according to claim 4, wherein said powdered solder metal comprises silicon.

6. A flux for brazing metal workpieces comprising irreversibly dehydrated $K_2AlF_5$ in the form of irregular crystals.

7. A flux according to claim 6, consisting of irreversibly dehydrated $K_2AlF_5$ in the form of irregular crystals.

8. A flux according to claim 4, wherein said powdered solder metal comprises at least one of copper and germanium.

9. A flux according to claim 4, wherein said powdered solder metal comprises at least one element selected from the group consisting of iron, manganese, nickel, zinc, bismuth, strontium, chromium, antimony and vanadium.

* * * * *